United States Patent Office 3,451,929
Patented June 24, 1969

3,451,929
PHOSPHORUS-CONTAINING SALTS OF PARTICULAR ACID AND AMINO REACTION PRODUCTS
Edwin J. Latos, Chicago, Ill., assignor to Universal Oil Products Company, Des Plaines, Ill., a corporation of Delaware
No Drawing. Filed Oct. 5, 1966, Ser. No. 584,338
Int. Cl. C10m 1/44, 3/38, 5/24
U.S. Cl. 252—32.5                 9 Claims

ABSTRACT OF THE DISCLOSURE

Phosphate salts of the reaction product of a polyhalopolyhydropolycyclicdicarboxylic acid or derivative with a polyamine or alkanolamine can be prepared using a stoichiometric excess of from 3 to 30 moles of reaction product per mole of phosphate. These products are useful as extreme pressure additives to lubricating oil.

---

This application relates to novel compositions of matter comprising phosphorus-containing salts of particular acid and amino reaction products and to the use thereof.

The present applicant and others have demonstrated heretofore that salts of the type set forth above are novel compositions of matter and also are very effective additives for lubricating oils. These salts are particularly effective in imparting E.P. (extreme pressure) properties to lubricating oils used under severe conditions. Heretofore, these salts were prepared by utilizing substantially stoichiometric equivalents of the phosphorus compound and the reaction product or an excess of the phosphorus compound. These proportions are stated to be from about 0.5 to about 4 mole proportions of the phosphorus compound per one mole proportion of the reaction product.

Surprisingly, I now have found that even improved results are obtained when these reactants are used in non-stoichiometric proportions in which the reaction product is used in an excess of from about 3 to about 30 mole proportions thereof per one mole proportion of the phosphorus compound. These improved results will be illustrated in the appended examples.

In one embodiment the present invention relates to a salt formed by the reaction at a temperature of from ambient to about 70° C. of one mole proportion of a phosphorus compound with from 3 to about 30 mole proportions of the reaction product formed at a temperature of from about 10° to about 250° C. of from 1 to 2 mole proportions of a polyamine or alkanolamine with one mole proportion of a polyhalopolyhydropolycyclicdicarboxylic acid, anhydride, diol or ester.

Any suitable phosphorus compound may be used in preparing the salt of the present invention. While phosphoric acid may be used, the phosphorus compound preferably is selected from alkyl phosphate, alkyl phosphinate, alkyl phosphonate and their thio analogues. In a particularly preferred embodiment, an alkyl phosphate is employed and includes both the alkyl acid orthophosphates and the alkyl acid pyrophosphates. In the alkyl acid orthophosphate, the monoalkyl ester, dialkyl ester or mixtures thereof may be employed and preferably contain at least one alkyl group of at least 6 carbon atoms and more particularly from 6 to about 20 or more carbon atoms. In another embodiment, the phosphorus compound is prepared by the oxyalkylenation of an alcohol, which may be of aliphatic or aromatic configuration, and then forming the phosphate thereof. Still other suitable phosphorus compounds include alkylthiophosphates, and preferably dialkyldithiophosphates, as well as the thiophosphates and dithiophosphates of the oxyalkylenated aliphatic or aromatic alcohols. These different phosphorus compounds are set forth in detail in application Ser. No. 330,008, filed Dec. 12, 1963, in the name of the present applicant and Charles M. Hayes now U.S. Patent 3,294,-816. In the interest of brevity, specific phosphorus compounds and details of their preparation are not repeated in the present application but the same are incorporated herein and shall be considered as part of the present application. Also included as suitable phosphorus compounds are the alkyl or dialkyl phosphonic or phosphinic acids and their thio analogues, as well as the aryl, alkaryl or polyalkaryl phosphoric, phosphonic or phosphinic acids. When desired the alkyl or aryl groups may be substituted by halogen and especially chlorine.

As hereinbefore set forth the phosphate or thiophosphate is reacted with the reaction product of certain acids or derivatives thereof and an amino compound. The particular acid is a polyhalopolyhydropolycyclicdicarboxylic acid, anhydride, diol or ester thereof, and may be illustrated by the following general formula

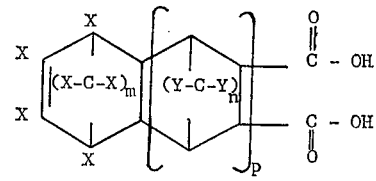

in which X is selected from the group consisting of halogen and particularly chlorine and/or bromine, hydrogen and an alkyl radical of from one to ten and preferably from one to four carbon atoms, at least two of the X's being halogen, Y is selected from the group consisting of halogen, hydrogen and an alkyl radical of one to ten and preferably from one to four carbon atoms, $m$ is an integer of from one to four, $n$ ranges from zero to four and $p$ ranges from zero to four.

The above structure illustrates the dicarboxylic acid. In the interest of simplicity, the corresponding anhydride is not illustrated, but is readily ascertainable from the above structure. Particularly preferred acidic compounds include 5,6,7,8,9,9-hexachloro - 1,2,3,4,4a,5,8,8a - octahydro-5,8-methano-2,3-naphthalenedicarboxylic acid, 5,6,7,8,9,9-hexachloro-1,2,3,4,4a,5,8,8a - octahydro - 1,4,5,8-di-methano-2,3-naphthalenedicarxoylic acid, 1,4,5,6,7,7-hexachlorodicyclo-(2.2.1)-5-heptene - 2,3 - dicarboxylic acid, the corresponding anhydrides, diols or esters. Here again, other specific acids and details of the preparation of the acids are set forth in application Ser. No. 330,008, now U.S. Patent 3,294,816 and, in the interest of brevity, are not reported herein but shall be considered as part of the present application. While the acid or anhydride set forth above is preferred, it is understood that an ester of the acid may be used. Any suitable ester may be used and is prepared by reacting the acid with an alcohol under conditions to liberate water. While the alcohol may contain from one to eighteen carbon atoms, it preferably contains one to four carbon atoms. Illustrative alcohols include methanol, ethanol, propanol, butanol, pentanol, hexanol, etc.

In still another embodiment the corresponding mono or diol of the dicarboxylic acids set forth above may be used. The diol is readily prepared by reacting hexachlorocyclopentadiene with 1,4-butenediol in a manner similar to that described previously to form the diol corresponding to "Chlorendic" acid. In another example the diol is prepared by reacting hexachlorocyclopentadiene with alpha-allyl glycerol ether. These reactions are well known in the art and are described, for example, in U.S. Patent 3,007,958. Similarly, hexachlorocyclopentadiene is reacted with 2,3 - dimethanocyclohex - 5 - ene to form the diol. It is understood that any suitable mono or diol of the dicarboxylic acid may be used. In another embodiment, the diol is reacted with a dicarboxylic acid or anhydride either prior to or simultaneously with the reaction with the amino compound. Illustrative dicarboxylic acids include malonic acid, succinic acid, glutaric acid, adipic acid, pimelic acid, suberic acid, azelaic acid, sebacic acid, etc., and the corresponding anhydrides. The reaction is readily affected by refluxing the mixture, preferably in the presence of a suitable solvent. Illustrative solvents include aromatic hydrocarbons as benzene, toluene, xylene, cumene, etc., or other solvents such as decalin.

The acid, anhydride, diol or ester is reacted with an amino compound. In one embodiment the amino compound is a polyamine, containing at least 2 amino groups, which may be primary, secondary and/or tertiary amines. In a preferred embodiment, at least one amino group is a primary or secondary amine. Illustrative aliphatic amines comprise unsubstituted and preferably substituted alkylene polyamines including ethylenediamine, N-alkyl-ethylenediamine, N,N'-dialkyl-ethylenediamine, N,N-dialkyl-ethylenediamine, corresponding propylenediamines, butylenediamines, pentylenediamines, hexylenediamines, etc., N-alkyl-diethylenetriamine, $N^1,N^3$-dialkyl-diethylenetriamine, $N^1,N^2,N^3$-trialkyl-diethylenetriamine, similarly substituted dipropylenetriamines, dibutylenetriamines, dipentylenetriamines, dihexylenetriamines, etc., N-alkyl-triethylenetetraamine, $N^1,N^4$-dialkyl - triethylenetetraamine, $N^1,N^2,N^4$-trialkyl - triethylenetetraamine, $N^1,N^2,N^3,N^4$-tetraalkyl-triethylenetetraamine, similarly substituted tripropylenetetraamine, tributylenetetraamine, tripentylenetetraamine, trihexylenetetraamine, etc. In another embodiment the diamines are N-alkyl-diaminoalkanes and particularly N-alkyl-1,3-diaminopropanes in which the alkyl group contains from about 8 to about 25 carbon atoms, including commercially available "Duomeen T" and "Diam 26" in which the alkyl group is derived from tallow. Also included are the correspondingly substituted diaminoethanes, diaminobutanes, diaminopentanes, diaminohexanes, etc. In still another embodiment the polyamine is an aromatic diamine including ortho, meta and particularly para-phenylenediamines, as well as the N-alkylated, N,N-dialkylated, N,N,N'-trialkylated and N,N,N',N'-tetraalkylated phenylenediamines. Other aromatic amines include diaminodiphenylalkanes in which the alkane moiety contains from 1 to 6 or more carbon atoms, diaminodiphenyl ether, diaminodiphenyl sulfide, diaminodiphenyl amine, as well as those diaminodiphenyl compounds in which one or both of the amino groups are substituted with alkyl radicals of from 1 to 16 or more carbon atoms. Here again, numerous polyamines are specifically set forth in application Serial No. 330,008 now U.S. Patent 3,294,816 and are incorporated herein and made part of the present application.

Other preferred polyamines are the beta-alkylpolyamines, in which at least one alkyl group is attached to the nitrogen atom at the beta or second carbon atom of the alkyl group. Such amines are available commercially under the tradename of "Duomeen L-15" which is a N-beta-alkylpropylenediamine in which the alkyl group contains 17 carbon atoms. This compound also may be named N-1-methyl-heptadecylpropylenediamine. Here again it is understood that other beta-alkyldiamines may be employed and will comprise N-1-methyl-alkylalkylenediamines, in which the alkyl moiety, exclusive of the methyl group, preferably contains from 2 to about 25 carbon atoms.

In another embodiment the amino compound for reacting with the acid, anhydride, diol or ester is an alkanolamine. In one embodiment, the alkanolamine contains at least 2 hydroxyl and 1 amino group or at least 1 hydroxyl and 2 amino groups. Illustrative examples in the first class of compounds include dialkanolamines and particularly N-aliphatic dialkanolamines in which the aliphatic group attached to the nitrogen atom contains from 1 to about 50 and preferably from 8 to about 22 carbon atoms. The alkanol groups preferably contain from 2 to about 4 carbon atoms each, although they may contain up to 20 carbon atoms each. Illustrative compounds include N-alkyl-diethanolamines in which the alkyl contains from 1 to 50 and preferably from 8 to 22 carbon atoms. Also included are the N-alkenyldiethanolamines in which the alkenyl group contains from 1 to 50 carbon atoms. It is understood that the aliphatic substituent may be straight or branched chain. Other N-aliphatic dialkanolamines include the correspondingly substituted N-aliphatic dipropanolamines, N-aliphatic dibutanolamines, N-aliphatic dipentanolamines, N-aliphatic dihexanolamines, etc. Particularly preferred N-alkyl-diethanolamines include the commercially available compounds as N-tallow-diethanolamine (marketed under the tradename of "Ethomeen T/12") which is a gel at room temperature, has an average molecular weight of 364, a specific gravity at 25°/25° C. of 0.916 and contains from 12 to 20 and mostly 16 to 18 carbon atoms per alkyl substituent. Other commercially available compounds include "Ethomeen S/12" which is N-soya diethanolamine, "Ethomeen C/12" which is N-coco-diethanolamine, "Ethomeen 18/12" which is N-stearyl-diethanolamine, etc.

Illustrative alkanolamines containing 1-hydroxyl and 2-amino groups include aminoalkyl alkanolamines containing from 4 and preferably from 6 to about 50 carbon atoms. Illustrative compounds include aminoethyl ethanolamine, aminoethyl propanolamine, aminoethyl butanolamine, aminoethyl pentanolamine, aminoethyl hexanolamine, etc., aminopropyl ethanolamine, aminopropyl propanolamine, aminopropyl butanolamine, aminopropyl pentanolamine, aminopropyl hexanolamine, etc., aminobutyl ethanolamine, aminobutyl propanolamine, aminobutyl butanolamine, aminobutyl pentanolamine, aminobutylhexanolamine, etc., aminopentyl ethanolamine, aminopentyl propanolamine, aminopentyl butanolamine, aminopentyl pentanolamine, aminopentyl hexanolamine, etc., aminohexyl ethanolamine, aminohexyl propanolamine, aminohexyl butanolamine, aminohexyl hexanolamine, etc. Here again, one or both of the nitrogen atoms of the aminoalkyl alkanolamine may contain hydrocarbon substituents and particularly alkyl group or groups of from one to twenty carbon atoms each or cycloalkyl groups and particularly cyclohexyl, or mixtures of alkyl and for cycloalkyl groups.

In another embodiment the alkanolamine is an N,N-di-substituted-alkanolamine, including particularly N,N-di-aliphatic-alkanolamines in which the aliphatic groups contain from 1 to about 50 and preferably from 1 to about 20 carbon atoms. Particularly preferred are the N,N-dialkylalkanolamines in which the alkyl group contains from 1 to about 20 carbon atoms and the alkyl groups are the same. In another embodiment the alkyl groups may be different. The alkanolamine moiety preferably contains from 2 to about 8 carbon atoms and thus will be selected from ethanolamine, propanolamine, butanolamine, pentanolamine, hexanolamine, heptanolamine, octanolamine, etc., in which the carbon atoms may be straight or branched chain. In another embodiment the N,N - disubstituted-alkanolamine comprises N,N-dicycloalkylalkanolamine in which the cycloalkyl groups contain from 5 to 8 carbon atoms each and in which the alkanolamine is selected from those hereinbefore set forth. Particularly preferred in this embodiment is N,N-dicyclohexyl-ethanolamine. In another embodiment the substituents are aryl as illustrated by N,N-diphenyl-alkanolamine, N,N-ditolyl-alkanolamine, N,N-dixylyl-alkanolamine, N,N-diethylphenyl-alkanolamine, N,N-dipropylphenyl-alkanolamine, N,N - dinaphthyl - alkanolamine, N,N - dimethylnaphthyl - alkanolamine, N,N - diethylnaphthylalkanolamine, etc. in which the alkanolamine moiety is selected from those hereinbefore set forth.

The acid, anhydride, diol or ester is reacted with the amino compound in any suitable manner. Details of the reaction are described in application Ser. No. 330,008 now U.S. Patent 3,294,816 and such details are incorporated in and made part of the present specifications. Briefly, these reactions include the following description. In one embodiment, when using the polyamine, the reaction product is a salt or neutralization product formed under conditions which avoid the liberation of water and, in another embodiment, the reaction product is formed with the liberation of water. When the reaction product is a salt, it may be either the mono or half salt or the double salt. When the mono or half salt is desired, the reactants are reacted in an equal mole proportion of acid and polyamine. When the double salt is desired the reactants are reacted in a proportion of one mole of acid and 2 moles of amine. The salt is prepared under mild conditions and conveniently by intimately mixing the reactants at ambient temperature (about 10° to about 32° C.) although an elevated temperature which generally will not exceed from about 70° C. may be employed, particularly when the reaction is effected under superatmospheric pressure which may range from 5 to 500 p.s.i. or more. The time of mixing will be sufficient to effect substantially complete reaction and may vary from about 0.25 to 12 hours or more. A solvent preferably is used and conveniently comprises an aromatic hydrocarbon including benzene, toluene, xylene, ethylbenzene, cumene or mixture thereof. Other solvents include paraffinic hydrocarbons, ethers, etc.

When the reaction using a polyamine is effected with the liberation of water, the reactants are reacted in a ratio of one mole proportion of acid and from 1 to 2 mole proportions of polyamine and equal mole proportions of anhydrides and polyamine. An excess of polyamine may be used. The reactants are conveniently prepared as solutions in suitable solvents and heated to refluxing conditions to cause inter-reaction of the acid or anhydride and the polyamine, with the liberation of water. The refluxing temperature generally will be in the range of from 80° to about 250° C. and a pressure of from 5 to 500 p.s.i. or more, with the time of refluxing being within the range of from about 0.5 to 12 hours or more. The water formed during the reaction preferably is continuously removed from the reaction zone.

In the preparation of the reaction product accompanied by the liberation of water, it is believed that the reaction product is an imide-amine, although it may be a mono and/or diamide. In one embodiment this product is recovered in admixture with the solvent and may be used as such for the next step of the process. However, when desired, the solvent may be removed in any suitable manner, including distillation under atmospheric or subatmospheric pressure to recover the intermediate product free of solvent.

When the amino compound is an alkanolamine containing at least 2 hydroxyl or amino groups, the reaction product is a polymer which will comprise polyesters and, when prepared from polyaminoalkanols, probably also will include polyamides in addition to the polyesters. This reaction is effected by refluxing with the removal of water in the same manner as hereinbefore described. When utilizing an N,N-di-substituted alkanolamine, the reaction product is an ester formed by the reaction of the hydroxyl group with the carboxylic acid or derivative thereof. However, the substituent groups on the nitrogen atom of the N,N-di-substituted alkanolamine preclude further reaction of the nitrogen atom with the dicarboxylic acid or derivative and thereby precludes the formation of polymeric reaction products. The reaction product will contain basic nitrogen and thereby permits formation of the phosphate salt. When a lower ester of the dicarboxylic acid is reacted with the alkanolamine, the product will comprise a new ester by transesterification.

The phosphate, thiophosphate, phosphinate or phosphonate of the reaction product is prepared in any suitable manner. As hereinbefore set forth, it is essential that the phosphorus-containing compound is reacted in considerably less than stoichiometric proportions. Accordingly, one mole proportion of the phosphorus compound is reacted with 3 to about 30 and preferably 6 to about 12 mole proportions of the reaction product. The salt is prepared in any suitable manner and conveniently by mixing the reaction product and the phosphorus compound at ambient temperature or an elevated temperature which generally will not exceed about 70° C. The mixing may be effected at atmospheric pressure or, when desired, superatmospheric pressure in the range of from about 5 to about 100 p.s.i.g. or more. The time of mixing will range from a fraction of an hour to 24 hours or more and generally from about ¼ to about 4 hours. When desired, the phosphorus-containing compound may be prepared as a solution in a suitable solvent and then commingled with the reaction product. Conveniently the solvent will be the same as used in an earlier step of the process. In any event the preparation of the salt preferably is effected in the presence of a solvent and here again the solvent conveniently is selected from those hereinbefore set forth. Conveniently, the salt is recovered as a solution in a suitable solvent and is used in this manner as an additive to organic substrates. However, when the product is recovered in the absence of a solvent or when the product is not substantially soluble in the substrate, the desired solubility may be obtained by dissolving the reaction product in a mutual solvent. Suitable solvents for this purpose comprise phenols and particularly alkyl phenols or polyalkyl phenols in which the alkyl group or groups contain from 6 to 20 carbon atoms. The phenol may be used in a concentration of from 5% and preferably from 20% to 200% by weight of the salt. However, it has been found that the salt of the present invention is more readily soluble in the substrate than the salt prepared heretofore and accordingly the use of a mutual solvent may not be required.

As hereinbefore set forth, the salt of the present invention is particularly advantageous for use in lubricating oil and particularly in lubricating oils which must meet severe requirements. It will be noted that the salt of the present invention contains halogen, nitrogen and phosphorus in one embodiment and also sulfur in another embodiment. Experience has shown that compounds containing these elements are especially advantageous for use in lubricating oils subject to severe conditions. However, while the reaction product of the present invention is especially useful in such lubricating oils, it is understood that it also is used to advantage in other lubricating oils. Another advantage of the compositions of the present invention is that certain of these compositions will not cause darkening of the oil during use.

The lubricating oil may be of natural or synthetic origin. The mineral oils include those of petroleum origin and are referred to as motor lubricating oil, railroad type lubricating oil, marine oil, transformer oil, turbine oil, differential oil, diesel lubricating oil, gear oil, cylinder oil, specialty products oil, etc. Other natural oils include those of animal, marine or vegetable origin.

Synthetic lubricating oils are of varied types including aliphatic esters, polyalkylene oxides, silicones, esters of phosphoric and silicic acids, highly fluorine-substituted hydrocarbons, etc. Of the aliphatic esters, di-(2-ethylhexyl) sebacate is being used on a comparatively large commercial scale. Other aliphatic esters include dialkyl azelates, dialkyl suberates, dialkyl pimelates, dialkyl adipates, dialkyl glutarates, etc. Specific examples of these esters include dihexyl azelate, di-(2-ethylhexyl) azelate, di-3,5,5-trimethylhexyl glutarate, di-3,5,5-trimethylpentyl glutarate, di-(2-ethylhexyl) pimelate, di-(2-ethylhexyl) adipate, triamyl tricarballylate, pentaerythritol tetracaporate, dipropylene glycol dipelargonate, 1,5-pentanediol-di-(2-ethylhexanonate), etc. The polyalkylene oxides include polyisopropylene oxide, polyisopropylene oxide diether, polyisopropylene oxide diester, etc. The silicones include methyl silicone, methylphenyl silicone, etc., and the silicates include, for example, tetraisooctyl silicate, etc. The highly fluorinated hydrocarbons include fluorinated oils, perfluorohydrocarbons, etc.

Additional synthetic lubricating oils include (1) neopentyl glycol esters in which the ester group contains from three to twelve carbon atoms or more, and particularly neopentyl glycol propionates, neopentyl glycol butyrates, neopentyl glycol caproates, neopentyl glycol caprylates, neopentyl glycol pelargonates, etc., (2) trimethylol alkanes such as trimethylol ethane, trimethylol propane, trimethylol butane, trimethylol pentane, trimethylol hexane, trimethylol heptane, trimethylol octane, trimethylol decane, trimethylol undecane, trimethylol dodecane, etc., as well as the esters thereof and particularly triesters in which the ester portions each contain from three to twelve carbon atoms and may be selected from those hereinbefore specifically set forth in connection with the discussion of the neopentyl glycol esters, and (3) tricresylphosphate, trioctylphosphate, trinonylphosphate, tridecylphosphate, as well as mixed aryl and alkyl phosphates, etc.

The present invention also is used in the stabilization of greases made by compositing one or more thickening agents with an oil of natural or synthetic origin. Metal base synthetic greases are further classified as lithium grease, sodium grease, calcium grease, barium grease, strontium grease, aluminum grease, etc. These greases are solid or semi-solid gels and, in general, are prepared by the addition to the lubricating oil of hydrocarbon soluble metal soaps or salts of higher fatty acids as, for example, lithium stearate, calcium stearate, aluminum napthtenate, etc. The grease may contain one or more thickening agents such as silica, carbon black, talc, organic modified Bentonite, etc., polyacrylates, amides, polyamides, aryl ureas, methyl N-n-octadecyl terephthalomate, etc. Another type of grease is prepared from oxidized petroleum wax, to which the saponifiable base is combined with the proper amount of the desired saponifying agent, and the resultant mixture is processed to produce a grease. Other types of greases in which the features of the present invention are usable include petroleum greases, whale grease, wool grease, etc., and those made from inedible fats, tallow, butcher's waste, etc.

Oils of lubricating viscosity also are used as transmission fluids, hydraulic fluids, industrial fluids, etc., and the novel features of the present invention are used to further improve the properties of these oils. During such use the lubricity properties of the oil are important. Any suitable lubricating oil which is used for this purpose is improved by incorporating the additive of the present invention.

Oils of lubricating viscosity also are used as cutting oils, rolling oils, soluble oils, drawing compounds, etc. In this application, the oil is used as such or as an emulsion with water. Here again, it is desired that the oil serves to lubricate the metal parts of saws, knives, blades, rollers, etc., in addition to dissipating the heat created by the contact of the moving metal parts.

Oils of lubricating viscosity also are used as slushing oils. The slushing oils are employed to protect finished or unfinished metal articles during storage or transportation from one area to another. The metal articles may be of any shape or form including steel sheets, plates, panels, coils, bars, etc., which may comprise machine parts, engines, drums, piston rings, light arms, etc., as well as farm machinery, marine equipment, parts for military or other vehicles, household equipment, factory equipment, etc. A coating which may be visible to the eye, or not, as desired, covers the metal part and protects it from corrosion, etc.

While the salt of the present invention is particularly advantageous in substrates subjected to high temperatures, it is understood that it may be used in other substrates which deteriorate in storage, during treatment and/or in use. These other substrates include motor fuels such as unsaturated gasoline, blends of unsaturated and satrated gasolines, etc., jet fuel, diesel oil, fuel oil, residual oil, drying oil, rubber, polyolefins, resins, waxes, etc.

The salt of the present invention is used as an additive in lubricating oil in a small but stabilizing concentration. Depending upon the particular use, the additive may be employed in a concentration of from about 0.01% to about 25% and preferably from about 0.05% to about 10% by weight of the oil. These and the following concentrations are on the basis of the active constituent and do not include the solvent or solubilizing phenol when used. When used in conventional lubricating oil, the additive generally is employed in a concentration of from about 0.01% to about 2% by weight of the oil. When used in lubricating oil for more severe operations, such as hypoid gear oil, the additive is used in a concentration of from about 1% to about 20% or more by weight of the oil. In general, substantially the same range of additive concentration is employed when the oil is used as transmission fluid, hydraulic fluid, industrial fluid, etc. When the oil is used in the formulation of a grease, the additive is used in a concentration of from about 0.5% to about 5% by weight of the oil. When used in cutting oil, rolling oil, soluble oil, drawing compound, etc., the additive may be used in a concentration of from about 0.1% to about 10% by weight of the oil. When used in slushing oil, the additive may be used in a concentration of from about 0.1% to about 15% by weight or more of the oil.

It is understood that the salt of the present invention may be used along with other additives incorporated in the oil for specific purposes. In most cases, it is desirable to also incorporate an additional antioxidant in the oil. Preferred additional antioxidants are of the phenolic type and include tertiarybutylcatechol, 2,6-ditertiarybutyl-4-methylphenol, 2,4-dimethyl-6-tertiarybutylphenol, etc., 2-tertiarybutyl-4-methoxyphenol, 2-tertiarybutyl-4-ethoxyphenol, etc. Also, other additives incorporated in lubricating oil include metal deactivator, dye, viscosity index improver, pour point depressor, anti-foaming additive, detergent, etc. In some cases, particularly when used with the additional antioxidants set forth above, a synergistic effect is obtained and thus an even greater improvement in the properties of the substrate is obtained.

In another embodiment the salts of the present invention possess insecticidal properties with good inner-therapeutic action. They may be employed against many types of mites and insects such as, for example, Corausius larvae, Cotoneaster aphid, apple aphid, black bean aphid, aster aphid, green peach aphid, chrysanthemum aphid, pea aphid, etc. The reaction products or mixture of these may be used for the control of various larvae, mites, eggs of mites and such insects as flour beetle, mexican bean beetle, black carpet beetle, milkweed bug, german cockroaches, southern army worms, mealy bug, sow bug, citrus red spider, greenhouse red spider, various mosquitoes, yellow fever mosquito, malarial mosquito, house-flies, etc.

The salts of the present invention also posses flameproofing or flame retardant properties and, therefore, are useful in plastics, coatings, paints, drying oils, etc., as well as in fibrous materials. For example, in textiles, the salt imparts flame retardant as well as fungicidal properties to the fabric.

The following examples are introduced to illustrate further the novelty and utility of the present invention but not with the intention of unduly limiting the same.

EXAMPLE I

As hereinbefore set forth the salts are prepared by using the reaction product in an excess of from 3 to about 20 mole proportions thereof per one mole of phosphorus compound. Surprisingly these salts show improved properties as compared to the salts prepared using stoichiometric proportions of the reaction product and the phosphorus compound and those prepared when using an excess of the phosphorus compound. This is illustrated in the present examples in which salts containing different proportions of phorphorus compound were prepared and evaluated.

In this example a master batch of the reaction product was prepared and then separate batches thereof were used to prepare the different salts. The master batch of reaction product was prepared to form the imide-amine by reacting substantially equal mole proportions of 5,6,7,8,9, 9 - hexachloro - 1,2,3,4,4a,5,8,8a - octahydro - 5,8-methano - 2,3 - naphthalenedicarboxylic anhydride (referred to in the earlier application and herein as "A" anhydride) with N-alkyl-1,2-diaminopropane in which the alkyl contains 18 carbon atoms. This amine is available commercially under the tradename "Duomeen L–15" and is a beta-alkyl diamine. The reaction product was prepared by refluxing at a temperature up to 120° C. 1700 g. (4 mole) of "A" anhydride, 1500 g. (4 moles plus 10% excess) of Duomeen L–15 and 3000 g. of toluene. Approximately 92 ml. of water was removed during the refluxing which was continued until no more water was liberated. The reaction mixture was treated with anhydrous potassium carbonate and filtered. A 100 g. sample of the reaction mixture was distilled to remove the solvent. The solvent-free product was a light amber oil and was analyzed and found to have a basic nitrogen equivalent of 1.50 mg./g. which corresponds to the theoretical basic nitrogen equivalent of 1.515.

As hereinbefore set forth a number of different phosphate salts were prepared. The phosphate used in this example is a mixture of mono and di-tridecyl-ortho-acid phosphate. Different salts were prepared by intimately mixing the required proportions of the phospate with the reaction product and heating on a steam bath (temperature about 97° C.). These different salts contained the reaction product and phosphate in proportions to give a ratio of basic equivalent to acidic equivalent of 1:1, 2:1 and 8:1.

The 1:1 ratio salt was prepared by mixing 100 g. of the reaction product solution and 27 g. of the phosphate, after which the toluene solvent was removed by distillation under vacuum at 97° C., and the salt was recovered as a dark amber heavy paste.

The 2:1 ratio salt was prepared by mixing 100 g. of the reaction product solution and 13.5 g. of the phosphate. The toluene solvent was removed by vacuum distillation and the salt was recovered as a dark amber heavy oil.

The 8:1 ratio salt was prepared by mixing 120 g. of the reaction product solution and 4 g. of the phosphate. The toluene solvent was removed by vacuum distillation and the salt was recovered as light amber viscous oil.

EXAMPLE II

The salts of this example are the mono and di-tridecyl ortho acid phosphates of the reaction product of "A" anhydride with N-oleyl-diethanolamine (available commercially as "Ethomeen O–12") and containing 17 carbon atoms in the oleyl radical. The reaction product was prepared by refluxing 1700 g. of "A" anhydride, 1472 g. of "Ethomeen O–12" and 3172 g. of toluene solvent. The refluxing temperature was about 114° C. and was continued until 69 cc. of water was collected. A portion of the reaction product solution was stripped of solvent and recovered as a dark amber very viscous oil. Analysis showed a basic nitrogen equivalent weight of 788 g. which corresponds to the theoretrical equivalent weight of 775 g.

A number of different phosphate salts were prepared. The phosphate used in this example is a mixture of mono and di-tridecyl-ortho acid phosphate. Different salts were prepared by intimately mixing different proportions of the phosphate with the reaction product at room temperature.

Different salts were prepared to have a basic equivalent to acid equivalent of 7:1, 8:1, 9:1, 10:1, 15:1, and 20:1. The 7:1 salt was prepared using 156 g. of the reaction product and 5 g. of the phosphate. The 8:1, 9:1, 10:1, 15:1 and 20:1 salts were prepared using 100 g. of the reaction product and 3, 2.7, 2.4, 1.6 and 1.2 g. of the phosphate, respectively. The toluene solvent was removed from each preparation by vacuum distillation. All salts were recovered as heavy amber viscous oils.

EXAMPLE III

The salt of this example is the polyoxyethylenated nonylphenol phosphate salt of the reaction product of "A" anhydride with diethylenetriamine having a basic to acidic ratio of 6:1. The reaction product is prepared by gradually adding 213 g. (0.5 mole) of "A" anhydride to 258 g. (2.5 moles) of diethylenetriamine over a one hour period. Following this, 200 ml. of benzene is added and the mixture is heated and refluxed for about 1.5 hours. Approximately 9 ml. of water is removed during the refluxing. The benzene is removed by distillation on a steam bath. Excess diethylenetriamine is removed by distillation under high vacuum. At this point, the reaction mixture is a yellow-orange brittle solid having a basic nitrogen equivalent weight of 220 g. The product is ground to a fine powder and washed several times with water, dissolved in methanol and dried with anhydrous sodium sulfate. This is followed by filtering and evaporation of the methanol, to leave a red viscous clear liquid which crystallizes to a red solid upon standing. The product has a basic nitrogen equivalent weight of 262 g. This corresponds to a theoretical nitrogen equivalent of 255 for the equal mole reaction product which, as hereinbefore set forth, is believed to be an imide-amine.

The salt is prepared by mixing at room temperature, with intimate stirring, 6 basic equivalents of the "A" anhydride-diethylenetriamine reaction product with 1 acidic equivalent of the polyoxyethylenated nonylphenol phosphate. The product is recovered as a brown viscous liquid.

EXAMPLE IV

The salt of this example is the dithiophosphate salt of the reaction product prepared as described in Example III, having a basic to acidic ratio of 8:1. The dithiophosphate used in this example is di-sec-octyl-dithiophosphate. The salt is prepared by mixing at room temperature, with intimate stirring, 8 basic equivalents of the "A" anhydride-diethylene-triamine reaction product with one acidic equivalent of the di-sec-octyl-dithiophosphate. The product is recovered as a brown viscous liquid.

EXAMPLE V

The salt of this example is the 10:1 basic to acidic salt of the mixed mono and di-octyl acid orthophosphate salts of the mono salt prepared by the reaction of equal mole proportions of "A" acid and "Duomeen T." As hereinbefore set forth. "Duomeen T" is N-aryl-1,3-diaminopropane in which the alkyl group contains from twelve to twenty carbon atoms and mostly sixteen to eighteen carbon atoms. The "A" acid and "Duomeen T" are admixed in equal mole proportions at room temperature with intimate stirring. For ease in handling and reaction, the "A" acid is prepared as a solution in benzene and the "Duomeen T" is added thereto. Following completion of the reaction, the solvent is removed from the mixture and the mono salt is recovered as a viscous material. To this product is added 0.1 equivalent proportion of the mixed mono- and dioctyl acid orthophosphates and intimately stirred at room temperature until completion of the reaction.

EXAMPLE VI

The salt of this example is the 8:1 basic to acidic salt of mixed mono- and didecyldithiophosphates and the reaction product of "A" acid and "Duomeen T" prepared by reacting two mole proportions of "Duomeen T" with one mole proportion of "A" acid at room temperature with intimate mixing. The reaction conveniently is effected in benzene solvent and the double salt is recovered in the solvent. The mixed mono and didecyldithiophosphates are added in a ratio of 1 acidic equivalent per 8 basic equivalents. The salt is prepared by intimately mixing the reactants at room temperature.

EXAMPLE VII

The salt of this example is prepared by first reacting equal mole proportions of "B" anhydride (5,6,7,8,9,9-hexachloro - 1,2,3,4,4a,5,8,8a - octahydro - 1,4,5,8-dimethano-2,3-naphthalenedicarboxylic anhydride) and "Diam 26." As hereinbefore set forth, "Diam 26" is substantially the same as "Duomeen T." This reaction is effected by refluxing the "B" anhydride and "Diam 26" in benzene solvent, with the concomitant removal of water formed during the reaction. Following completion of the reaction, 0.1 equivalent proportion of polyoxyethylenated nonylphenol phosphate containing an average of about five polyoxyethylenated groups is commingled with the "B" anhydride "Diam 26" reaction mixture. The resulting mixture is stirred at room temperature for a sufficient time to effect salt formation.

EXAMPLE VIII

The salt of this example is prepared by first reacting equal mole proportions of "HET" acid (1,4,5,6,7,7-hexachlorodicyclo-(2.2.1)-5-heptene-2,3-dicarboxylic acid) and "Duomeen T." The reaction is conveniently effected in the presence of ethyl ether solvent and the reaction mixture is intimately stirred at room temperature until completion of the reaction. To the reaction mixture there is added 0.125 equivalent proportions of dodecyl thiophosphate and then is stirred at room temperature until salt formation is effected.

EXAMPLE IX

The salt of this example is the 10:1 basic to acidic salt of di-(oxyethylenated nonylphenol) phosphate, containing an average of 5 oxyethylene groups per each nonylphenyl group, with the polymeric reaction product of "A" anhydride (5,6,7,8,9,9-hexachloro-1,2,3,4,4a,5,8, 8a - octahydro - 5,8-methano-2,3-naphthalenedicarboxylic anhydride) with N-tallow-diethanolamine (Ethomeen T/12). The polymeric reaction product is prepared by refluxing 106.25 g. (0.25 mole) of the "A" anhydride and 92 g. (0.25 mole) of the N-tallow-diethanolamine in the presence of 200 g. of xylene. Refluxing is continued for about seven hours at a maximum temperature of about 300° F., during which time a total of 4.5 cc. of water is collected. Following completion of the reaction, the xylene solvent is removed by distilling under water pump vacuum at a maximum temperature of about 330° F. The polymeric reaction product has a basic nitrogen equivalent of 1.31 meq./g. and a basic mole combining weight of 764, the latter corresponding to the theoretical mole combining weight of 775.

The salt is prepared by mixing at room temperature 10 basic equivalents of the polymeric reaction product described above and one basic equivalent of the di-(oxyethylenated nonylphenol) phosphate, containing an average of 5 oxyethylene groups, after which the mixture is heated on a steam bath with continuous stirring. The salt is recovered as a heavy amber oil.

EXAMPLE X

The salt of this example is the 10:1 basic to acidic salt of di-(oxyethylenated nonylphenol) dithiophosphate, containing an average of 8 oxyalkylene groups per each nonylphenol group, with the polymeric reaction product described in Example IX. In this preparation 10 basic equivalents of the polymeric reaction product is mixed with one acidic equivalent of the di-(oxyethylenated nonylphenol)-dithiophosphate. The reactants are intimately stirred at room temperature, following which the mixture is heated on a steam bath with continued stirring. The salt is recovered as a heavy amber oil.

EXAMPLE XI

The salt of this example is prepared as a 10:1 basic to acidic salt of mixed mono- and ditridecyl acid orthophosphate with the polymeric reaction product prepared by reacting "A'" anhydride with N,N'-dioctyl-N-hydroxyethyl-aminoethyl-ethanolamine. The alkanolamine is prepared by the oxyethylenation of N,N'-dioctyl-ethylenediamine. The polymeric reaction product is prepared by refluxing 47.4 g. (0.125 basic equivalent) of the aminoethyl ethanolamine and 53 g. (0.125 acidic equivalent) of the "A" anhydride in the presence of 200 g. of xylene. The refluxing is continued for about nine hours and a total of 2 cc. of water is collected. The xylene solvent is removed by distilling under water pump vacuum at a temperature of about 400° F. The polymeric reaction product has a basic nitrogen equivalent of 2.33 meq./g. and a basic mole combining weight of 429.

The salt is prepared by mixing, at room temperature, 10 basic equivalents of the polymeric reaction product with one acidic equivalent of the mixed mono- and ditridecyl acid orthophosphates, followed by heating on a steam bath with continuous stirring. The salt is recovered as a heavy amber oil.

EXAMPLE XII

The salt of this example is prepared by reacting one acidic equivalent of mixed mono- and dioctyl-dithiophosphates with 10 basic equivalents of the polymeric reaction product prepared by reacting the diol corresponding to "Chlorendic" acid, N-tallow-diethanolamine (Ethomeen T 12) and dodecenyl succinic anhydride. The diol is prepared by reacting hexachlorocyclopentadiene with 1,4-butenediol. The polymeric reaction is prepared by refluxing 45.13 g. (0.125 mole) of the "Chlorendic" diol, 48 g. (0.125 mole) of N-tallow-diethanolamine and 70.5 g. (0.25 mole) of dodecenyl succinic anhydride. The refluxing is effected at a temperature of about 340° F. for about eight hours and a total of 4.5 cc. of water is collected. The xylene solvent is removed by distilling at a temperature up to about 350° F. under water pump vacuum. The product is recovered as a heavy amber oil.

The salt is prepared by mixing on a steam bath one acidic equivalent of the mixed mono- and dithiophosphates and 10 basic equivalents of the polymeric reaction product prepared in the above manner. The salt is recovered as a heavy amber oil.

EXAMPLE XIII

The salt of this example is prepared by reacting one acidic equivalent of di-(oxypropylenated dodecanol)-phosphate, containing an average of 5 oxypropylene groups per each dodecyl group, with 8 basic equivalents of an ester of "B" acid (5,6,7,8,9,9-hexachloro-1,2,3,4,4a,5,8,8a-octahydro - 1,4,5,8 - dimethano - 2,3 - naphthalenedicarboxylic acid) and ethanol, with N-decyl-aminopropyl-propanolamine. The ester of "B" acid and ethanol is prepared by refluxing equal mole proportions of the acid and alcohol under conditions to liberate water, the water being removed simultaneously during the reaction. The resulting ester and N-decyl-aminopropyl-propanolamine are refluxed in the presence of xylene solvent to liberate water and to form the polymeric reaction product.

The salt is prepared by commingling 8 basic equivalents of the polymeric reaction product with 1 acidic equivalent of the di-(oxypropylenated dodecanol) phosphate and heated on a steam bath with intimate stirring. Salt is recovered as a heavy amber oil.

EXAMPLE XIV

The salt of this example is the 8:1 basic to acidic salt of O-capryl-O-hexyl-dithiophosphate and the polymeric reaction product of "A" acid and N-soya-diethanolamine (Ethomeen S/12). The polymeric reaction product is prepared by refluxing equal mole proportions of the "A" acid and N-soya-diethanolamine and removing the water formed during the reaction. Eight basic equivalents of the polymeric reaction product is mixed with one acidic equivalent of the O-capryl-O-hexyl-dithiophosphate and then heated on a steam bath with intimate stirring. The addition reaction product is recovered as a heavy amber oil.

EXAMPLE XV

The salt of this example is prepared by mixing 15.8 g. (0.1 mole) of benzene phosphonic acid with 1 basic equivalent of the polymeric reaction product of "A" anhydride (5,6,7,8,9,9-hexachloro-1,2,3,4,4a,5,8,8a-octahydro-5,8-methano-2,3-naphthalenedicarboxylic acid anhydride) with N-tallow-diethanolamine (Ethomeen T/12). An exothermic reaction results. The product is heated to 210° F. to complete the reaction. A 50% by weight solution in xylene is made, and the product used as anti-fouling and flame-proofing additive in fire retardant paint.

EXAMPLE XVI

In this example, one basic equivalent of the polymeric reaction product of "A" anhydride and N-tallow-diethanolamine (Ethomeen T/12) is mixed with 14.2 g. of benzene phosphinic acid. An exothermic reaction results. The product is heated to 210° F. to complete the reaction. The product is used in automatic transmission oil as a lubricity additive.

EXAMPLE XVII

The salt of this example is prepared by first forming the reaction product of 5,6,7,8,9,9-hexachloro-1,2,3,4,4a, 5,8,8a - octahydro - 5,8 - methano - 2,3 - naphthalenedicarboxylic anhydride, herein referred to as "A" anhydride, with N,N-diethyl-ethanolamine and then reacting the resultant reaction product with mixed mono- and di-tridecyl acid orthophosphate to form the 10 basic to 1 acidic salt. The reaction product is prepared by refluxing 106.25 g. (0.25 mole) of the "A" anhydride and 59 (0.5 mole) of N,N-diethylethanolamine in the presence of 100 g. of toluene. Refluxing is continued for about 8 hours at a maximum temperature of about 250° F., during which time about 4.5 cc. of water is collected. Following completion of the reaction, the toluene solvent is removed by distillation under water pump vacuum at a temperature of about 340° F. The reaction product has a basic nitrogen equivalent of 2.97 meq./g. and a basic mole combining weight of 337, the latter corresponding to the theoretical mole combining weight of 319.

The salt is prepared by first dissolving 10 basic equivalents of the above reaction product in a commercial paraffinic oil in order to form a 50% solution for ease in handling and reacting. With mixing at room temperature, one acidic equivalent of mixed mono- and di-tridecyl ortho acid phosphate is added. The salt is recovered as a homogeneous solution in the paraffinic oil.

EXAMPLE XVIII

The salt of this example is prepared by reacting one acidic equivalent of di-(oxyethylenated nonylphenol) phosphate, containing an average of 4 oxyethylene groups per each nonylphenyl group, with the reaction product of "A" anhydride and N,N-dicyclohexyl-ethanolamine. The reaction product is prepared by gradually adding over a period of 15 minutes, with stirring at room temperature, 425 g. (one mole) of "A" anhydride to a solution of 450 g. (two moles) of N,N-dicyclohexyl ethanolamine dissolved in one liter of toluene. The reaction is mildly exothermic, the temperature rising to about 100° F. The reaction mixture is then heated to about 240° F. for one hour, during which time some water and toluene are liberated. About one liter of xylene then is added in increment portions and the mixture is heated and refluxed at 293° F. for several days, during which time 16 cc. of water is collected. The reaction mixture then is cooled and filtered to remove a small amount of solid material. The filtrate, which comprised about 59% by weight solution of active material in xylene, is recovered in an amount of 1362 grams, which corresponds to a yield of 94% of theoretical. A small portion of the solution is stripped of solvent and recovered as a dark, brittle glass. Analysis shows a basic equivalent weight of 433 g. which corresponds to the theoretical equivalent weight of 428.5 g.

The salt is prepared by mixing at room temperature 10 basic equivalents of the reaction product solution in xylene prepared as described above, and one acidic equivalent of di-(oxyethylenated nonylphenol) phosphate, containing an average of 4 oxyethylene groups per each nonylphenyl group. The reaction is mildly exothermic and the reaction mixture then is warmed on a steam bath with continued stirring. Following completion of the reaction, the reaction mixture is heated under vacuum to about 208° F. to remove the xylene solvent.

EXAMPLE XIX

As hereinbefore set forth the salt of the present invention is of especial utility in substrates encountering high temperatures during use. An example of such a substrate is lubricating oil and especially such oil used in the lubrication of hypoid gears which must meet severe requirements of high torque-low speed, low torque-high speed and high torque-high speed conditions. The requirements are even more severe because such oils must retain their lubricity properties for long periods of time as exemplified, for example, by the recommendations of not changing oil for one year or more or 20,000 miles or more of operation and even up to 100,000 miles or for the life of the vehicle.

One method of evaluating E.P. (extreme pressure) lubricating oils is by the Falex machine. This procedure is described in detail in a book entitled "Lubricant Testing" authored by E. G. Ellis and published by Scientific Publications (Great Britain) Limited, 1953, pages 150–154. Briefly, the Falex machine consists of a rotating pin which runs between two V shape bearings which are spring loaded against the pin and provided with means for varying the load. The oil to be tested is poured into a metal trough in which the pin and bearings are partly submerged. The machine was operated for 5 minutes each at 250, 500, 750, 1000 pound loads and for 45 minutes at 1250 pound load. The data collected includes the temperature of the oil at each of the loads and the torque in inch pounds at each load, as well as the wear which is determined at a ratchet wheel arrangement in which the teeth are advanced in order to maintain the desired load. Each tooth is equivalent to approximately 0.000022 inch. Preferred additives are those which impart low temperature, low torque and low wear to the oil.

In another series of tests the machine was operated for 5 minutes at each load from 250 pounds to seizure at 250 pound increments. The maximum load and the time in minutes at this load to seizure are reported, as well as the temperature of the oil. In this case the higher temperature is preferred because it means that the oil is operating satisfactorily at a higher temperature.

The lubricating oil used in this example is a mixture of commercial lube oils free of additives blended to give a viscosity at 100° F. of 113.8 cs. and at 210° F. of 11.73 cs. which approximates an S.A.E rating of 85.

Run No. 1 in the following table is a run made using the lubricating oil not containing an additive and thus is the blank or control run.

Run No. 2 is a run made with another sample of the lubricating oil to which had been added 10% by weight of the salt, prepared as described in Example I, having a basic to acidic ratio of 1:1.

Run No. 3 is a run made using another sample of the lubricating oil to which had been added 10% by weight of the salt, prepared as described in Example I, having a basic to acidic ratio of 2:1.

cating oil containing 10% by weight of the salt having a basic to acidic ratio of 1:1.

Run No. 7 was made using another sample of the lubricating oil containing 10% by weight of the salt having a basic to acidic ratio of 2:1.

Run No. 8 was made using another sample of the lubricating oil containing 10% by weight of the salt having a basic to acidic ratio of 10:1.

Run No. 9 was made using another sample of the lubricating oil containing 10% by weight of a salt having a basic to acidic ratio of 15:1.

TABLE III

| | Temperature, °F. | | | | | | | Torque, lbs. | | | | | | |
|---|---|---|---|---|---|---|---|---|---|---|---|---|---|---|
| | 250 | 500 | 750 | 1,000 | 1,250 | 1,500 | 1,750 | 250 | 500 | 750 | 1,000 | 1,250 | 1,500 | 1,750 |
| Run No.: | | | | | | | | | | | | | | |
| 5 | 177 | 230-S | | | | | | 6-7 | S | | | | | |
| 6 | 167 | 273 | 344 | 383 | 450 | | | 5-6 | 14-16 | 19-22 | 22-25 | 28->100 | | |
| 7 | 168 | 280 | 345 | 384 | 460 | | | 4-6 | 13-16 | 17-19 | 20-23 | 25->100 | | |
| 8 | 154 | 244 | 300 | 364 | 411 | 478 | 740 | 4-5 | 11-14 | 14-16 | 19-21 | 23-25 | 26-30 | 35-105 |
| 9 | 163 | 243 | 297 | 365 | 425 | 525 | | 5-6 | 12-17 | 16-19 | 21-24 | 26-31 | 33-80 | |

| | Wear, Teeth | | | | | | | Seizure Conditions | | |
|---|---|---|---|---|---|---|---|---|---|---|
| | 250 | 500 | 750 | 1,000 | 1,250 | 1,500 | 1,750 | Load | Time (minutes) | Temperature, °F. |
| 5 | 0 | 0-S | | | | | | 500 | <0.1 | 230 |
| 6 | 0 | 0 | 4 | 9 | 0-S | | | 1,250 | 1-34/60 | 450 |
| 7 | 0 | 0 | 2 | 7 | 3-S | | | 1,250 | 1-34/60 | 460 |
| 8 | 0 | 0 | 5 | 8 | 12 | 20 | >111 | 1,750 | 1 | 740 |
| 9 | 0 | 0 | 7 | 6 | 12 | 115 | | 1,500 | 2-10/60 | 525 |

S=Seizure.

Run number 4 is a run made using another sample of the lubricating oil to which had been added 10% by weight of the salt, prepared as described in Example I, having a basic to acidic ratio of 8:1.

From the data in the above table it will be seen that the runs made with the salts having a basic to acidic ratio of 1:1 (Run No. 6) and 2:1 (Run No. 7) both underwent seizure at 1250 pounds. Run No. 8 which was

TABLE I

| | Temperature, °F. | | | | | | Torque, lbs. | | | | | | Wear, Teeth | | | | | |
|---|---|---|---|---|---|---|---|---|---|---|---|---|---|---|---|---|---|---|
| | 250 | 500 | 750 | 1,000 | 1,250 | 1,500 | 250 | 500 | 750 | 1,000 | 1,250 | 1,500 | 250 | 500 | 750 | 1,000 | 1,250 | 1,500 |
| Run No.: | | | | | | | | | | | | | | | | | | |
| 1 | 213 | 295-S | | | | | 7-9 | 10-S | | | | | 0 | 0-S | | | | |
| 2 | 174 | 254 | 313 | 355 | 410-S | | 7-9 | 14-17 | 19-23 | 23-26 | 28->110 | | 0 | 0 | 2 | 7 | 5-S | |
| 3 | 168 | 240 | 332 | 372 | 425-S | | 6-9 | 11-16 | 19-21 | 22-24 | 26->110 | | 0 | 0 | 2 | 8 | 0-S | |
| 4 | 145 | 216 | 276 | 352 | 380 | 420 | 5-9 | 10-15 | 14-17 | 19-23 | 23-26 | 25-30 | 0 | 0 | 4 | 5 | 8 | 10 |

S=Seizure.

TABLE II.—SEIZURE CONDITIONS

| | Load | Time (minutes) | Temperature °F |
|---|---|---|---|
| Run No.: | | | |
| 1 | 500 | 1.1 | 295 |
| 2 | 1,250 | 1.1 | 410 |
| 3 | 1,250 | 0.8 | 425 |
| 4 | 1,725 | 0 | 460 |

From the above data it will be seen that the runs containing the salts having basic to acidic ratios of 1:1 (Run No. 2) and 2:1 (Run No. 3) both underwent seizure at a load of 1250 pounds. In contrast, the oil containing the salt having a basic to acidic ratio of 8:1 (Run No. 4) did not undergo seizure until a load of 1725 lbs. These data demonstrate the surprising effect obtained with the salt having the reaction product in excess to the phosphorus compound.

EXAMPLE XX

This example compares the results of evaluations made with salts having basic to acidic ratios of 1:1, 2:1, 10:1 and 15:1. These runs were made in substantially the same manner as described in the previous example except that the lubricating oil used in this example was a commercial S.A.E. 90 gear base oil which was obtained free of additives. The salts used in this example were prepared with the same reactants and in the same manner as described in Example I.

Run No. 5 was made with a sample of the lubricating oil not containing an additive and thus is the blank or control run.

Run No. 6 was made with another sample of the lubrimade with the 10:1 basic to acidic ratio salt did not undergo seizure until a load of 1750 pounds. The run using the 15:1 basic to acidic ratio salt did not undergo seizure until a load of 1500 pounds. These data again demonstrate the surprising benefits of utilizing the critical basic to acidic ratios as set forth in the present application.

EXAMPLE XXI

The salts prepared as described in Example II were evaluated in the Falex machine in the manner described in Example XIX. The lubricating oil used in this example is a commercial lubricating oil obtained free of additives.

Run No. 10 in the following table is a run made using the lubricating oil not containing an additive and thus is the blank or control run.

Run No. 11 is a run made using the lubricating oil containing 10% by weight of the salt having a basic to acidic ratio of 7:1.

Run No. 12 is a run made using the lubricating oil containing 10% by weight of the salt having a basic to acidic ratio of 8:1.

Run No. 13 is a run made using the lubricating oil containing 10% by weight of the salt having a basic to acidic ratio of 9:1.

Run No. 14 is a run made using the lubricating oil containing 10% by weight of the salt having a basic to acidic ratio of 10:1.

Run No. 15 is a run made using the lubricating oil containing 10% by weight of the salt having a basic to acidic ratio of 15:1.

Run No. 16 is a run made using the lubricating oil containing 10% by weight of the salt having a basic to acidic ratio of 20:1.

From the data in the above table, it will be seen that,

TABLE IV

| | Temperature, °F. | | | | | | | | Torque, lbs. | | | | | | | |
|---|---|---|---|---|---|---|---|---|---|---|---|---|---|---|---|---|
| | 250 | 500 | 750 | 1,000 | 1,250 | 1,500 | 1,750 | 2,000 | 250 | 500 | 750 | 1,000 | 1,250 | 1,500 | 1,750 | 2,000 |
| Run Number: | | | | | | | | | | | | | | | | |
| 10 | 220 | 270-S | | | | | | | 7-9 | 20-S | | | | | | |
| 11 | 200 | 268 | 332 | 380 | 438 | ~630 | 653 | 710 | 6-7 | 12-15 | 18-20 | 23-24 | 27-28 | 39-100 | 44-51 | 49-51 |
| 12 | 188 | 268 | 333 | 425 | ~570 | 610 | 665 | 708 | 6-7 | 14-17 | 19-21 | 26-27 | 32-90 | 41-46 | 47-50 | 51-55 |
| 13 | 165 | 252 | 335 | 400 | ~600 | ~603 | ~675 | 720 | 5-7 | 12-14 | 17-20 | 23-27 | 33 | ~53 | ~48 | ~57 |
| 14 | 190 | 270 | 337 | 400 | ~565 | ~588 | 650 | 705 | 6-7 | 13-16 | 19-21 | 25-26 | 30-40 | 40-60 | 30-50 | 51-58 |
| 15 | 189 | 274 | 360 | ~543 | ~553 | 650 | 715 | 752 | 6-7 | 13-5 | 19-20 | 29-55 | 34-40 | 42-44 | 48-50 | 51-52 |
| 16 | 182 | 275 | 387 | ~489 | ~575 | 654 | 700 | 750 | 5-6 | 13-14 | 21-23 | 25-60 | 33-41 | 44-47 | 47-49 | 51-53 |

| | Wear, Teeth | | | | | | | | Seizure Conditions | | |
|---|---|---|---|---|---|---|---|---|---|---|---|
| | 250 | 500 | 750 | 1,000 | 1,250 | 1,500 | 1,750 | 2,000 | Load | Time (minutes) | Temperature, °F. |
| Run No.: | | | | | | | | | | | |
| 10 | 0 | 0-S | | | | | | | 475 | <0.1 | 270 |
| 11 | 0 | 0 | 0 | 2 | 6 | 58 | 35 | 44 | 2,000 | 5 | 710 |
| 12 | 0 | 0 | 0 | 3 | 61 | 21 | 43 | 81 | 2,000 | 5 | 708 |
| 13 | 0 | 0 | 0 | 3 | 54 | 28 | 21 | 26 | 2,000 | 2 | 720 |
| 14 | 0 | 0 | 0 | 0 | 58 | 23 | 15 | 39 | 2,000 | 5 | 705 |
| 15 | 0 | 0 | 0 | 27 | 18 | 35 | 47 | 102 | 2,000 | 5 | 752 |
| 16 | 0 | 0 | 0 | 28 | 28 | 29 | 34 | 59 | 2,000 | 5 | 750 | in this particular oil, the salts having basic to acidic ratios of from 7:1 to 20:1 had loads of 2,000 pounds. This again demonstrates the improved results obtained with the novel salts of the present invention.

EXAMPLE XXII

Some of the salts prepared as described in Example II also were evaluated by the thermal oxidation stability test. This test is MIL-L-2105B. In general, this test comprises heating the oil samples to 325° F. for 50 hours, with air bubbling through the oil.

The results of these tests are reported in the following table. In all cases, the oil was the special S.A.E. No. 90 gear oil and the additives each were used in a concentration of 10% by weight.

TABLE V

| Basic:Acidic Ratio of Salt | Viscosity Increase, Percent | Pentane Insolubles | Benzene Insolubles, Percent |
|---|---|---|---|
| 1:1 | 36.4 | 3.99 | 3.00 |
| 2:1 | 22.5 | 4.34 | 3.22 |
| 8:1 | 5.8 | 0.91 | 0.57 |

From the data in the above table, it will be seen that the salt having a basic to acidic ratio of 8:1 was of considerably greater stability as evidenced by the much lower increase in viscosity and much lower percent insolubles.

EXAMPLE XXIII

The salt having a basic to acidic ratio of 8:1, prepared as described in Example I, is used in a concentration of 1% by weight as an additive in grease. The additive is incorporated in a commercial Mid-Continent lubricating oil having an S.A.E. viscosity of 20. Approximately 92% of the lubricating oil then is mixed with approximately 8% by weight of lithium stearate. The mixture is heated to about 450° F., with constant agitation. Subsequently the grease is cooled, while agitating, to approximately 250° F. and then the grease is further cooled slowly to room temperature.

The stability of the grease is tested in accordance with ASTM D942 method, in which method a sample of the grease is placed in a bomb and maintained at a temperature of 250° F. Oxygen is charged to the bomb, and the time required for a drop of 5 pounds pressure is taken as the Induction Period. A sample of the grease without additive will reach the Induction Period in about 8 hours. On the other hand, a sample of the grease containing 1% by weight of the additive will not reach the Induction Period for more than 100 hours.

EXAMPLE XXIV

An insecticidal composition is prepared by dissolving 1 g. of the salt having a basic to acidic ratio of 10:1, prepared as described in Example II, in 2 cc. of benzene and emulsifying the resultant solution with 100 cc. of water using Triton X-100 as the emulsifying agent. The resulting emulsion is sprayed into a cage containing houseflies and results in substantial knockdown.

I claim as my invention:

1. Salt formed by the reaction at a temperature of from ambient to about 70° C. of one mole proportion of a phosphorus compound selected from the group consisting of acid phosphate, acid phosphinate, acid phosphonate and the corresponding thio compounds with from 3 to about 30 mole proportions of the reaction product formed at a temperature of from about 10° to about 250° C. of from 1 to 2 mole proportions of a polyamine containing at least 2 amino groups or an alkanolamine selected from the group consisting of dialkanolamines, aminoalkyl alkanolamines and N,N-di-hydrocarbyl substituted-alkanolamines with one mole proportion of a polyhalopolyhydropolycyclic dicarboxylic acid, anhydride, diol or ester of said acid, said acid having the structural formula

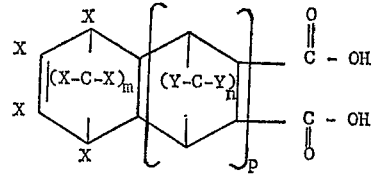

in which X is selected from the group consisting of chlorine, bromine, hydrogen and alkyl of from one to 10 carbon atoms, at least two of the X's being chlorine or bromine, Y is selected from the group consisting of chlorine, bromine, hydrogen and alkyl of from one to 10 carbon atoms, m is an integer of from one to 4, n ranges from zero to 4 and p ranges from zero to 4.

2. The salt of claim 1 wherein said acid or anhydride is 5,6,7,8,9,9 - hexachloro - 1,2,3,4,4a,5,8,8a - octahydro-5,8 - methano - 2,3 - naphthalenedicarboxylic acid or anhydride.

3. The salt of claim 1 wherein said acid or anhydride is 5,6,7,8,9,9 - hexachloro - 1,2,3,4,4a,5,8,8a - octahydro-1,4,5,8-dimethano-2,3-naphthalenedicarboxylic acid or anhydride.

4. The salt of claim 1 wherein said acid or anhydride is 1,4,5,6,7,7 - hexachlorodicyclo-(2.2.1)-5-heptene-2,3-dicarboxylic acid or anhydride.

5. The salt of claim 1 wherein said polyamine is N-alkyl-diaminoalkane containing from about 8 to about 25 carbon atoms in said alkyl and from 2 to about 6 carbon atoms in said alkane moiety.

6. The salt of claim 1 wherein said alkanolamine is a N-alkyl-dialkanolamine in which said alkyl contains from 1 to about 50 carbon atoms and said alkanol contains from 2 to about 20 carbon atoms.

7. The salt of claim 1 wherein said alkanolamine is a N,N-disubstituted alkanolamine in which the substitutions are selected from alkyl containing from 1 to about 50 carbon atoms and cycloalkyl containing from 5 to 8 carbon atoms.

8. The salt of claim 1 wherein said phosphorus compound is a mixture of mono and dialkylphosphates containing from about 6 to about 20 carbon atoms.

9. A lubricant comprising a major portion of an oil of lubricating viscosity and a minor amount, sufficient to impart extreme pressure properties, of the salt of claim 1.

References Cited

UNITED STATES PATENTS

| | | | |
|---|---|---|---|
| 3,388,191 | 6/1968 | Cyba | 252—32.5 XR |
| 3,294,816 | 12/1966 | Latos et al. | 252—49.9 XR |
| 3,316,175 | 4/1967 | Latos et al. | 252—32.5 |
| 3,331,892 | 7/1967 | Cyba | 252—49.8 XR |
| 3,371,039 | 2/1968 | Cyba | 252—32.5 XR |

PATRICK P. GARVIN, *Primary Examiner.*

U.S. Cl. X.R.

44—71; 252—32.7, 8.1; 260—45.85, 45.9, 801, 808, 814, 924, 925; 424—199